United States Patent
Yeo et al.

(10) Patent No.: US 10,964,977 B2
(45) Date of Patent: Mar. 30, 2021

(54) SEPARATOR FOR SECONDARY BATTERIES WITH ENHANCED STABILITY AND METHOD OF MANUFACTURING THE SAME

(71) Applicants: Hyundai Motor Company, Seoul (KR); Kia Motors Corporation, Seoul (KR)

(72) Inventors: Yeol Mae Yeo, Gyeonggi-do (KR); Ki Seok Koh, Gyeonggi-do (KR); Yoon Sung Lee, Gyeonggi-do (KR); Seung Min Oh, Gyeonggi-do (KR); Hong Seok Min, Gyeonggi-do (KR); Sung Min Choi, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 15/684,260

(22) Filed: Aug. 23, 2017

(65) Prior Publication Data

US 2018/0183108 A1 Jun. 28, 2018

(30) Foreign Application Priority Data

Dec. 26, 2016 (KR) .......................... 10-2016-0178862

(51) Int. Cl.
*H01M 10/0587* (2010.01)
*H01M 10/14* (2006.01)
(Continued)

(52) U.S. Cl.
CPC ........... *H01M 10/0587* (2013.01); *C08J 3/12* (2013.01); *C08J 3/18* (2013.01); *H01M 2/145* (2013.01);
(Continued)

(58) Field of Classification Search
CPC ............. H01M 10/14; H01M 10/0525; H01M 10/0587
See application file for complete search history.

(56) References Cited

U.S. PATENT DOCUMENTS

| 4,144,301 A * | 3/1979 | Adams ................ H01M 2/1673 264/126 |
| 2003/0175583 A1* | 9/2003 | Suzuki ............. H01M 10/0525 429/57 |

(Continued)

FOREIGN PATENT DOCUMENTS

| CN | 1929164 A | 3/2007 |
| CN | 101501895 A | 8/2009 |

(Continued)

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

Disclosed are a separator for secondary batteries with enhanced stability and a method of manufacturing the separator. The separator can prevent self-discharge which may occur when a porous non-woven fabric material is used for a separator; can perform a shutdown function at a high temperature of 200° C. or less; and can avoid even under harsh conditions of high temperatures, deterioration in stability caused by internal short-circuit of positive and negative electrodes. In particular, the separator for secondary batteries of the present invention includes a porous non-woven fabric material impregnated with a baroplastic polymer powder and pores of the porous non-woven fabric material are filled with the baroplastic polymer powder by pressing an assembly of the secondary battery.

4 Claims, 3 Drawing Sheets

(51) Int. Cl.
    *H01M 2/16* (2006.01)
    *H01M 10/42* (2006.01)
    *H01M 10/052* (2010.01)

(52) U.S. Cl.
    CPC ......... *H01M 2/162* (2013.01); *H01M 2/1653* (2013.01); *H01M 10/0525* (2013.01); *H01M 10/14* (2013.01); *H01M 10/4235* (2013.01); *H01M 10/052* (2013.01); *H01M 2220/20* (2013.01); *Y02E 60/10* (2013.01)

(56) References Cited

U.S. PATENT DOCUMENTS

| | | | | |
|---|---|---|---|---|
| 2008/0318122 | A1* | 12/2008 | Sun | H01M 2/0262 429/156 |
| 2010/0159314 | A1* | 6/2010 | Kim | H01M 2/1673 429/120 |
| 2010/0279173 | A1* | 11/2010 | Hying | H01M 2/162 429/247 |
| 2012/0015228 | A1 | 1/2012 | Yoon et al. | |
| 2015/0030906 | A1* | 1/2015 | Amin-Sanayei | H01G 11/52 429/144 |
| 2015/0132642 | A1* | 5/2015 | Joo | H01M 4/587 429/217 |
| 2016/0351875 | A1* | 12/2016 | Park | H01M 10/0525 |

FOREIGN PATENT DOCUMENTS

| | | |
|---|---|---|
| CN | 102388485 A | 3/2012 |
| CN | 104126239 A | 10/2014 |
| CN | 105470435 A | 4/2016 |
| CN | 106207054 A | 12/2016 |
| KR | 10-2015-0059462 A | 6/2015 |

\* cited by examiner

SEPARATOR FOR SECONDARY BATTERIES WITH ENHANCED STABILITY AND METHOD OF MANUFACTURING THE SAME

CROSS-REFERENCE TO RELATED APPLICATION

This application claims under 35 U.S.C. § 119(a) the benefit of priority to Korean Patent Application No. 10-2016-0178862 filed on Dec. 26, 2016, the entire contents of which are incorporated herein by reference.

BACKGROUND

(a) Technical Field

The present invention relates to a separator for secondary batteries with enhanced stability and a method of manufacturing the same. The separator for secondary batteries may prevent self-discharge, which may occur when a porous non-woven fabric material is used for a separator, and may perform a shutdown function at a high temperature of about 200° C. or less. Thus, even under harsh conditions of high temperatures, deterioration in stability caused by internal short-circuit of positive and negative electrodes may be prevented.

(b) Background Art

The development and commercialization of electric vehicles have brought about increasing interest in secondary batteries with improved safety. As the safety of secondary batteries directly may be associated with the safety of separators, separators with improved safety have been substantially studied and developed.

In order to secure stability of lithium secondary batteries, in addition to production of separator by a dry or wet method using a conventional polyolefin polymer, research has been focused on non-woven fabric separators with improved heat resistance using other polymers. However, these non-woven fabric separators may have substantially large pores and thus may have a risk of self-discharge. When such non-woven fabric separators are used, storage characteristics of secondary batteries may deteriorate. In addition, non-woven fabric separators may have problems of uneven or insufficient impregnation of electrolytes due to high porosity of non-woven fabric separators, as compared to separators produced by conventional dry or wet methods. Moreover, non-woven fabric separators produced using materials with excellent heat resistance may exhibit excellent heat resistance, but a shutdown function may not be sufficiently performed at high temperatures due to large pore size and high porosity, which may result in serious safety problems upon overcharging of secondary batteries.

Thus, there is a need for development of separators for secondary batteries, which may inhibit self-discharge, exhibit improved electrolyte impregnation, perform the function of shutdown and thus may provide improved stability.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspect, the present invention provides a separators produced by impregnating pores of a porous non-woven fabric material with a baroplastic polymer powder and pressing the porous non-woven fabric material upon assembly of a secondary battery such that the pores of the porous non-woven fabric material may be filled with the baroplastic polymer powder. As such, self-discharge of the secondary battery including the separator of the invention may be avoided, a shutdown function may be provided at a high temperature of about 200° C. or less and an internal short-circuit may be prevented.

In one aspect, the present invention provides a separator for secondary batteries with enhanced stability. The separator for secondary batteries with enhanced stability may include a porous non-woven fabric material; and a baroplastic polymer powder impregnated in the porous non-woven fabric material. In particular, pores in the porous non-woven fabric material may be filled with the baroplastic polymer powder by pressing.

The term "baroplastic" or "baroplastic polymer", as used herein, refers to a polymeric material that can change in phase or morphology thereof when a pressure is applied, for example, by exhibiting increased fluidity or flow of the material, with or without applying heat or thermal energy. For instance, the baroplastic material or polymer may be a rigid or rubbery solid under ambient condition but may flow or have fluidity when the pressure is applied.

In particular, the pores of a porous non-woven fabric material may be impregnated with a baroplastic polymer powder and pores of the porous non-woven fabric material may include the baroplastic polymer powder. In particular, the pores may be filled with the baroplastic polymer powder by pressing, for example, upon assembly of a secondary battery.

Preferably, the porous non-woven fabric material may include one or more selected from the group consisting of polyolefin, polyimide, aramid, cellulose, polyacrylonitrile, polyester and polyamide.

The pores of the porous non-woven fabric material may suitably have a size of about 1 μm to 100 μm and the porous non-woven fabric material may suitably have porosity of about 20% to 70%.

The baroplastic polymer powder may include one or more selected from the group consisting of polystyrene, polyisoprene, poly(n-butyl acrylate), 2-ethylhexyl acrylate, poly(pentyl methacrylate), poly(butyl methacrylate), polycarbonate, poly(methyl methacrylate), poly(vinyl chloride), poly(ethyl acrylate), poly(ethyl methacrylate), and polybutadiene.

The baroplastic polymer powder may suitably have an average particle diameter of about 10 to 100 μm.

The pressing the assembly of the secondary battery may be suitably carried out by hot-pressing at a temperature of about 20° C. to 100° C. and a pressure of about 1 to 4 ton/in².

The separator for the secondary battery may further include a coating layer of a binder solution formed on surfaces of the porous non-woven fabric material impregnated with the baroplastic polymer powder thereby preventing detachment of the baroplastic polymer powder. In particular, the binder solution may include i) at least one binder selected from the group consisting of polyvinylidene fluoride (PVdF), polyester and polyacrylonitrile; and ii) N-methyl-2-pyrrolidone (NMP) or N,N-dimethylacetamide (DMAc).

The term "binder", as used herein, refers to a polymeric resin or polymeric compound that may provide adhesion to a substrate or coating layer on a substrate. The binder may be cured, dried, hardened or polymerized by heat, UV, cross-linking agent, chemical additives, electron beams, or the like.

In another aspect, the present invention provides a method of manufacturing a separator for secondary batteries with enhanced stability. The method may include: (a) impregnating a porous non-woven fabric material with a baroplastic polymer powder; (b) coating surfaces of the baroplastic polymer powder-impregnated porous non-woven fabric material using a binder solution, (c) drying the coated porous non-woven fabric material, and (d) laminating a positive electrode and a negative electrode on the dried porous non-woven fabric material to form an assembly and pressing the assembly.

The term "assembly", as used herein, refers to an assembly including at least one or more components of a secondary battery. Preferably, the assembly of the present invention may include a positive electrode, a separator and a negative electrode. For instance, the assembly of the present invention may include the positive electrode attached to a first side of the separator, the negative electrode attached to a second side of the separator, and the separator. Preferably, the assembly of the present invention may be formed by laminating the positive electrode and the negative electrode to each side of the separator and pressing the same, for example, by hot pressing at elevated temperature and pressure conditions.

The porous non-woven fabric material may include one or more selected from the group consisting of polyolefin, polyimide, aramid, cellulose, polyacrylonitrile, polyester and polyamide.

Preferably, pores of the porous non-woven fabric material may have a size of about 1 μm to 100 μm and the porous non-woven fabric material may have porosity of about 20% to 70%.

The baroplastic polymer powder may suitably include one or more selected from the consisting of polystyrene, polyisoprene, poly(n-butyl acrylate), 2-ethylhexyl acrylate, poly(pentyl methacrylate), poly(butyl methacrylate), polycarbonate, poly(methyl methacrylate), poly(vinyl chloride), poly(ethyl acrylate), poly(ethyl methacrylate), and polybutadiene.

The baroplastic polymer powder may suitably have an average particle diameter of about 10 to 100 μm.

In step (d), the pressing may be carried out by hot-pressing at a temperature of about 20° C. to 100° C. and at a pressure of about 1 to 4 ton/in$^2$.

The binder solution for the coating in the step (b) may be prepared by dissolving at least one binder selected from the group consisting of polyvinylidene fluoride (PVdF), polyester and polyacrylonitrile in N-methyl-2-pyrrolidone (NMP) or N,N-dimethylacetamide (DMAc).

Further provided is a secondary battery including the separator as described herein.

Still further provided is a vehicle including the secondary battery as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
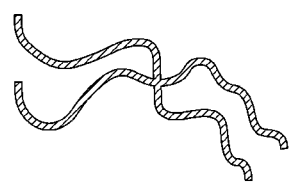
FIG. 1A shows a cross-section of a conventional porous non-woven fabric material and FIG. 1B shows a cross-section of an exemplary porous non-woven fabric material impregnated with an exemplary baroplastic polymer powder (left), and a cross-section of an exemplary porous non-woven fabric material impregnated with an exemplary baroplastic polymer powder after pressing (right), according to an exemplary embodiment of the present invention.
Figure 1B:
Figure 2:
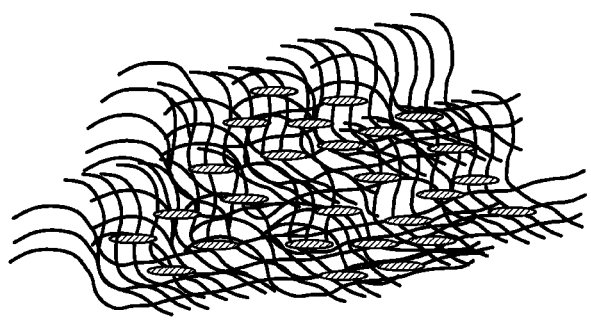
FIG. 2 shows an exemplary separator produced by hot pressing the porous non-woven fabric material impregnated with the baroplastic polymer powder according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, various aspects of the present invention will be described in more detail.

In order to inhibit self-discharge and perform the function of shutdown at a high temperature of 200° C. or less, the present invention provides a separator for secondary batteries with enhanced stability. In particular, the separator may include a porous non-woven fabric material containing pores and impregnated with a baroplastic polymer powder. The pores in the porous non-woven fabric material may be filled with the powder by pressing upon assembly of a secondary battery.

In an exemplary embodiment, the porous non-woven fabric material according to the present invention may have a melting point of about 200° C. or greater to impart high heat resistance. In particular, the porous non-woven fabric material may include one or more selected from the group consisting of polyolefin, polyimide, aramid, cellulose, polyacrylonitrile, polyester and polyamide. The non-woven fabric material may have pores having a size of about 1 μm to 100 μm and may have porosity of about 20% to 70%. Any porous non-woven fabric material used in the related arts may be used without limitation thereto.

However, the porous non-woven fabric material may result in self-discharge due to non-uniform and large pore size and high porosity, thereby causing deterioration in storage characteristics and electrolyte impregnation characteristics of secondary batteries. In addition, shutdown function may not be performed at high temperatures.

Accordingly, the present invention may solve the problems of conventional non-woven fabric separators by impregnating the non-woven fabric with the baroplastic polymer and molding the same.

According to an exemplary embodiment of the present invention, the baroplastic polymer impregnated in the pores of the porous non-woven fabric material may have miscibility of the block copolymer blends, e.g., polystyrene and polyisoprene, as being in the porous non-woven fabric material at a temperature of 90° C. or less, the baroplastic polymer impregnated in the pores of the porous non-woven fabric material may close pores of the separator at high temperatures to perform a shutdown function.

The baroplastic polymer may include one or more selected from the group consisting of polystyrene, polyisoprene, poly(n-butyl acrylate), 2-ethylhexyl acrylate, poly(pentyl methacrylate), poly(butyl methacrylate), polycarbonate, poly(methyl methacrylate), poly(vinyl chloride), poly(ethyl acrylate), poly(ethyl methacrylate) and polybutadiene. In particular, the baroplastic polymer may be a block copolymer of polystyrene and polyisoprene which may provide advantages such as formability at room temperature, formability at a low pressure and possibility of commercialization. Furthermore, the baroplastic polymer may be used in an amount of 15 to 60% by volume, or particularly in an amount of 20 to 50% by volume with respect to the volume of the porous non-woven fabric material. When the content of the baroplastic polymer is less than about 15% by volume, with respect to the volume of the porous non-woven fabric material, the baroplastic polymer may not be sufficient to fill pores of the non-woven fabric material during pressing and molding processes. When the content of the baroplastic polymer is greater than about 60% by volume the baroplastic polymer may cover surface pores of the non-woven fabric material. Accordingly, the baroplastic polymer may be included or impregnated in the amount within the range defined above.

Furthermore, large pores of the porous non-woven fabric material may be impregnated with the baroplastic polymer, such that the particles of the baroplastic polymer powder may be smaller than large pores present in the non-woven fabric material and may be greater than small pores present therein. Accordingly, in an exemplary embodiment of the present invention, the baroplastic polymer powder may have an average particle diameter of about 10 to 100 μm. When the average particle diameter is less than about 10 μm, the baroplastic polymer powder may not sufficiently fill large pores of the non-woven fabric separator, and when the average particle diameter is greater than about 100 μm, the baroplastic polymer powder may not sufficiently impregnate pores of the non-woven fabric separator. The baroplastic polymer may have the size or diameter within the range defined above.

In an exemplary embodiment, the pores of the non-woven fabric separator may be filled with the baroplastic polymer powder by impregnation and surfaces or both surfaces of the porous non-woven fabric material impregnated with the baroplastic polymer powder may be coated with a binder solution to improve bonding strength between the pores and the powder.

The binder solution may be obtained by dissolving at least one non-aqueous binder in a solvent. The non-aqueous binder may include, but not be limited thereto, one or more selected from the group consisting of polyvinylidene fluoride (PVdF), polyester and polyacrylonitrile. The solvent may be N-methyl-2-pyrrolidone (NMP) or N,N-dimethylacetamide (DMAc). For instance, the binder solution may be a solution of PVdF dissolved in NMP.

According to an exemplary embodiment, the porous non-woven fabric material may be impregnated with the baroplastic polymer powder to fill pores of the non-woven fabric material with the powder and the pores may be filled with the powder by pressing the assembly of the secondary battery.

For instance, a positive electrode and a negative electrode may be laminated on each side of the porous non-woven fabric material impregnated with the baroplastic polymer powder and then may be pressed by hot-pressing. The pressing may be carried out at a temperature of about 20° C. (room temperature) to about 100° C. and at a pressure of about 1 to 4 ton/in$^2$. When the pressing temperature is greater than about 100° C., the electrode and separator may be damaged. Thus, the pressing may be carried out at the temperature within the range defined above. In addition, when the pressing pressure is less than about 1 ton/in$^2$, the formability of the baroplastic polymer may deteriorate, and when the pressing pressure is greater than about 4 ton/in$^2$, electrode edges may be detached. Accordingly, the pressing may be carried out at the pressure within the range defined above.

In another aspect, the present invention provides a method of manufacturing a separator for secondary batteries with enhanced stability. The method may include: (a) impregnating a porous non-woven fabric material with a baroplastic polymer powder; (b) coating surfaces of the porous non-woven fabric material impregnated with the baroplastic polymer powder using a binder solution, (c) drying the porous non-woven fabric material coated with the binder solution, and (d) laminating a positive electrode and a negative electrode on the dried porous non-woven fabric material and pressing the positive electrode, the negative electrode, and the porous non-woven fabric material by a hot-pressing process. In an exemplary embodiment, the positive electrode and the negative electrode may be attached on each side of the dried porous non-woven fabric material.

In an exemplary embodiment, in the step (a), the porous non-woven fabric material may be impregnated with the baroplastic polymer powder. For instance, the baroplastic polymer powder may be impregnated by filtration.

The porous non-woven fabric material may be one or more selected from the group consisting of polyolefin, polyimide, aramid, cellulose, polyacrylonitrile, polyester and polyamide. The porous non-woven fabric material may contain pores having a size of about 1 μm to 100 μm and may have a porosity of about 20% to 70%. Any porous non-woven fabric material used in the related arts may be used without limitation thereto.

As described above, the baroplastic polymer may include one or more selected from the group consisting of polystyrene, polyisoprene, poly(n-butyl acrylate), 2-ethylhexyl acrylate, poly(pentyl methacrylate), poly(butyl methacrylate), polycarbonate, poly(methyl methacrylate), poly(vinyl chloride), poly(ethyl acrylate), poly(ethyl methacrylate), and polybutadiene. In particular, the baroplastic polymer may be a block copolymer of polystyrene and polyisoprene to impart formability at room temperature, formability at a low pressure and commercialization. Furthermore, as described above, the baroplastic polymer may be used in an amount of about 15 to 60% by volume, or particularly, in an amount of about 20 to 50% by volume, with respect to the volume of the porous non-woven fabric material.

The baroplastic polymer powder may have an average particle diameter of about 10 to 100 μm. When the average particle diameter is less than about 10 μm, the baroplastic polymer powder may not sufficiently fill large pores of the non-woven fabric separator, and when the average particle diameter is greater than about 100 μm, the baroplastic polymer powder may not sufficiently impregnate pores of the non-woven fabric separator. The average particle diameter of the baroplastic polymer may be within the range defined above.

In an exemplary embodiment, in the step (b), surfaces of the porous non-woven fabric material impregnated with the baroplastic polymer powder may be coated with a binder solution to improve bonding strength between the porous non-woven fabric material and the impregnated baroplastic polymer powder.

The binder solution may be obtained by dissolving at least one non-aqueous binder in a solvent. The non-aqueous binder may be selected from the group consisting of polyvinylidene fluoride (PVdF), polyester and polyacrylonitrile and the solvent may be, but not limited thereto, N-methyl-2-pyrrolidone (NMP) or N,N-dimethylacetamide (DMAc). For instance, the binder solution may include PVdF dissolved in NMP.

The coating of the separator may be carried out by various coating methods including dip coating, die coating and comma coating, and the coating method in the related arts may be used without limitation. For instance, the binder solvent may be coated on one surface of the non-woven fabric material impregnated with the baroplastic polymer powder and dried, and subsequently the other surfaces thereof may be coated and dried. Alternatively, the binder solvent may be simultaneously coated on both surfaces of the separator and then dried. The drying may be carried out at a temperature of about 80° C. to 120° C.

In an exemplary embodiment of the present invention, in the step (d), a positive electrode and a negative electrode may be attached or laminated on the dried porous non-woven fabric material and pressed, for example, by a hot-pressing process, which may be important for filling pores of the porous non-woven fabric material. For instance, by the pressing step, the baroplastic polymer powder may be prevented from being separated from the porous non-woven fabric material and bonding strength between the separator and the electrode may be improved. The separator manufactured by the method may be inserted or positioned between the positive electrode and the negative electrode to produce a lithium secondary battery.

The hot-pressing may be carried out at room temperature (e.g., about 20° C.) to a temperature of 100° C. and a pressure of about 1 to 4 ton/in$^2$. When the pressing temperature is greater than about 100° C., the electrode and the separator may be damaged. Thus, the pressing may be carried out at the temperature within the range defined above. When the pressing pressure is less than about 1 ton/in$^2$, the baroplastic polymer may not be sufficiently formed, and when the pressing pressure is greater than about 4 ton/in$^2$, electrode edges may be detached. Thus, the pressing may be carried out at the pressure within the range defined above.

In general, commercially available secondary batteries may explode when exposed to high temperatures or heat of 200° C. or greater. In order to secure safety of secondary batteries, equipment for preventing the temperature of the battery from increasing to 200° C. or higher may be required.

The separator manufactured according to the present invention may have a shutdown function by closing separator pores at a high temperature of about 200° C. or less. As described herein, the term "shutdown" refers to an operation that fine pores of the separator are blocked at high temperatures. The shutdown of the separator under the conditions, such as over-charging, allowing secondary batteries to be heated to high temperatures, may improve safety features of the secondary battery by suppressing additional heating.

Hereinafter, the present invention will be described in more detail with reference to examples. However, the examples are provided only for illustration of the present invention and the scope of the present invention is not limited to the examples.

EXAMPLE

Comparative Example 1: Case of Using Porous Non-Woven Fabric Separator (Conventional)

A secondary battery was produced using a porous non-woven fabric separator including 50% by weight of polyacrylonitrile (PAN) and 50% by weight of cellulose, an NCM-based positive electrode and a graphite negative electrode.

Comparative Example 2

A secondary battery was produced using a porous non-woven fabric separator including 50% by weight of aramid and 50% by weight of cellulose, an NCM-based positive electrode and a graphite negative electrode.

Example 1

A porous non-woven fabric material including 50% by weight of polyacrylonitrile (PAN) and 50% by weight of cellulose was impregnated by filtration with 50% by volume of a block copolymer of polystyrene and polyisoprene as a baroplastic polymer powder, and the porous non-woven fabric material was coated with a PVdF binder solution and was then dried at a temperature of 100° C. for one hour. Then, a positive electrode including an NCM-based active material, a graphite negative electrode and the dried porous non-woven fabric material were laminated and then hot-pressed at a temperature of 50° C. and at a pressure of 1.5 ton/in$^2$ to produce a secondary battery.

Test Example: Testing Confirming Stability Improvement

Figure 3:
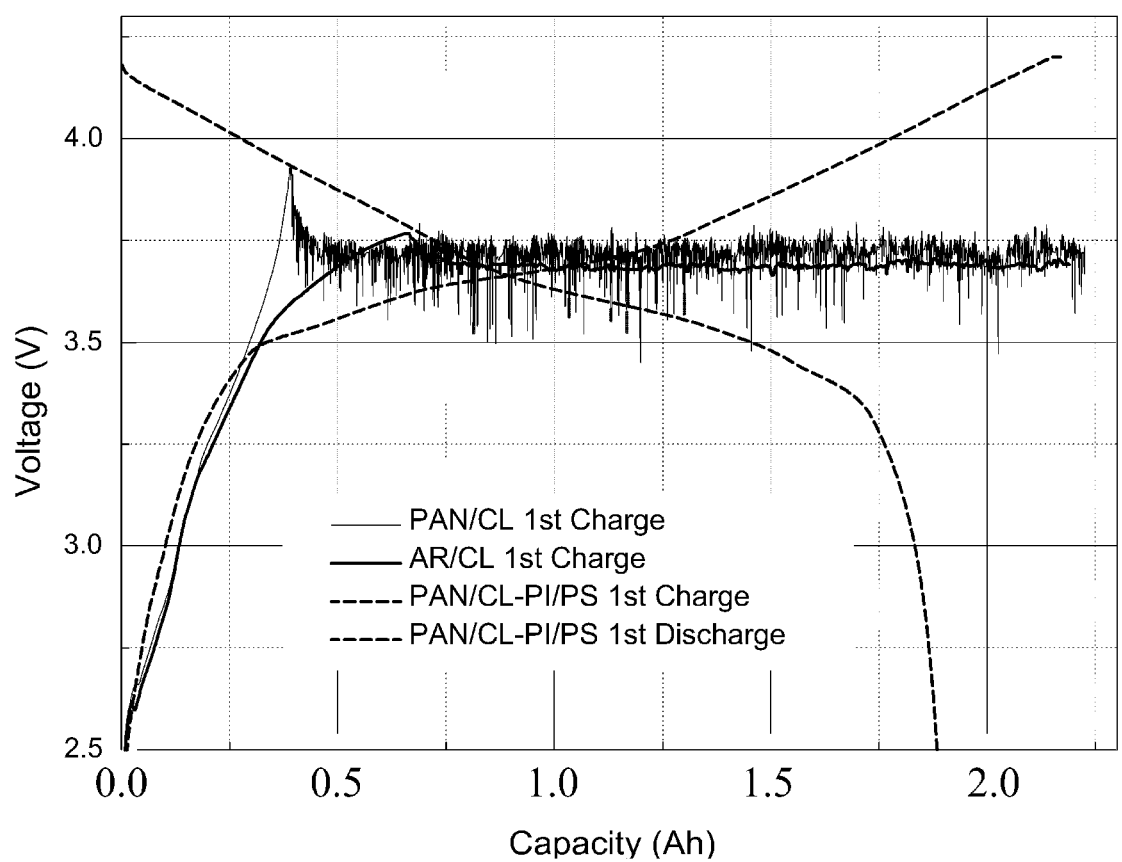
FIG. 3 is a graph showing a charge/discharge curve of an exemplary secondary battery from the results of Table 1.

Inhibition of self-discharge and presence of shutdown function were measured for secondary batteries produced in Examples and Comparative Examples and results are shown in Table 1 and FIG. 3.

(1) Method of measuring self-discharge inhibition: secondary batteries with a capacity of 2 Ah, produced in Examples and Comparative Examples were charge/discharged once at 45° C., 2.5 to 4.2 V, and 1 A (0.5 C).

(2) Method of measuring shutdown function: overcharge testing was carried out by charging secondary batteries with a capacity of 2 Ah produced in Examples and Comparative Examples at a current density of 4 A (2 C) and 12V, and measuring surface temperature and voltage variations thereof.

TABLE 1

| Items | Self-discharge | Overcharge temperature (max) |
|---|---|---|
| Example 1 PAN/CL-PI/PS | X | 78° C. |
| Comparative Example 1 PAN/CL | ○ | 151° C. |
| Comparative Example 2 AR/CL | ○ | 204° C. |

FIG. 3 shows a charge/discharge graph showing self-discharge results of Table 1. As can be seen from results of FIG. 3, Comparative Example using a conventional non-woven fabric separator exhibited abnormal charge behaviors due to self-discharge, while Example according to the present invention exhibited normal charge/discharge behaviors.

In addition, a battery using the baroplastic polymer-impregnated non-woven fabric separator as in Example according to an exemplary embodiment of the present invention exhibited a lower battery surface heating temperature upon overcharge than that of a battery produced using a conventional non-woven fabric separator.

Upon overcharge, the baroplastic polymer partly melted and thus closed pores of the non-woven fabric separator to prevent an internal short-circuit.

Accordingly, the separator with improved safety according to an exemplary embodiment of the present invention may inhibit self-discharge and perform a shutdown function in which pores of the separator may be blocked at a high temperature of 200° C. or less and may be thus widely used for secondary batteries.

As shown in the above description, the present invention may provide the following effects.

Firstly, pores of a porous non-woven fabric separator may be impregnated with a baroplastic polymer and then molded to fill large pores of the non-woven fabric material with the polymer, thereby inhibiting self-discharge of the non-woven fabric separator and improving room temperature and high-temperature storage characteristics of secondary batteries.

Secondly, the large pores of the porous non-woven fabric separator may be filled with the baroplastic polymer powder, thereby reducing difference in pore sizes and improving electrolyte impregnation property.

Thirdly, the baroplastic polymer impregnated in pores of the porous non-woven fabric separator may perform a shutdown function of blocking pores of the separator at high temperatures.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a separator for a secondary battery, comprising:
   (a) impregnating of a porous non-woven fabric material with a baroplastic polymer powder by filtration;
   (b) coating surfaces of porous non-woven fabric material impregnated with the baroplastic polymer powder using a binder solution;
   (c) drying the binder solution-coated on the porous non-woven fabric material; and
   (d) laminating a positive electrode and a negative electrode on the dried porous non-woven fabric material to form an assembly and pressing the assembly,
   wherein the baroplastic polymer powder is molded by pressing, and
   wherein pores in the porous non-woven fabric material are filled with the baroplastic polymer by molding the baroplastic polymer powder,
   wherein the pressing is carried out by hot-pressing at a temperature of about 20° C. to 100° C. and at a pressure of about 1 to 4 ton/in$^2$,
   wherein the baroplastic polymer powder comprises block copolymer of polystyrene and polyisoprene,
   wherein the baroplastic polymer powder has an average particle diameter of about 10 to 100 μm, and
   wherein an amount of the baroplastic polymer powder is 15% by volume to 60% by volume based on the volume of the porous non-woven fabric material.

2. The method according to claim 1, wherein the porous non-woven fabric material comprises one or more selected from the group consisting of polyolefin, polyimide, aramid, cellulose, polyacrylonitrile, polyester and polyamide.

3. The method according to claim 1, wherein pores of the porous non-woven fabric material has a size of about 1 μm to 100 μm and the porous non-woven fabric material has porosity of about 20% to 70%.

4. The method according to claim 1, wherein the binder solution is prepared by dissolving at least one binder selected from the group consisting of polyvinylidene fluoride (PVdF), polyester and polyacrylonitrile in N-methyl-2-pyrrolidone (NMP) or N,N-dimethylacetamide (DMAc).

* * * * *